United States Patent [19]

DeWeese

[11] 3,882,333
[45] May 6, 1975

[54] FAIL SAFE LINEAR MOTION DEVICE
[75] Inventor: John L. DeWeese, Monroeville, Pa.
[73] Assignee: Westinghouse Electric Corporation, Pittsburgh, Pa.
[22] Filed: Apr. 17, 1973
[21] Appl. No.: 351,917

[52] U.S. Cl. .................................. 310/14; 176/36 R
[51] Int. Cl. .................... H02k 41/02; H02k 33/00
[58] Field of Search ............ 310/12, 13, 14, 80, 83; 176/36 R; 74/527

[56] References Cited
UNITED STATES PATENTS

| 3,158,766 | 11/1964 | Frisch | 310/14 |
| 3,299,302 | 1/1967 | Frisch | 310/14 X |
| 3,480,807 | 11/1969 | Downs et al. | 310/14 X |
| 3,483,082 | 12/1969 | Dosch et al. | 310/14 X |
| 3,572,161 | 3/1971 | Lichtenberger et al. | 310/14 X |
| 3,714,479 | 1/1973 | Moore et al. | 310/80 |
| 3,765,585 | 10/1973 | Ruoss | 310/14 X |

Primary Examiner—Gerald Goldberg
Attorney, Agent, or Firm—Z. L. Dermer

[57] ABSTRACT

The invention provides a linear motion device which electromechanically moves an element in a step-by-step manner. A mechanical interlock arrangement is included with the device to prevent the element from being released upon the occurrence of a sudden interruption of electrical power. Thus, a linear motion device is disclosed which fails safe by retaining the element.

9 Claims, 20 Drawing Figures

FAIL SAFE LINEAR MOTION DEVICE

BACKGROUND OF THE INVENTION

1. Field of the Invention

This invention pertains to linear motion devices, and more particularly to a linear motion device actuated by magnet coils including means for preventing an element associated therewith from being released in the event of a sudden interruption of electrical power.

2. Description of the Prior Art

Present linear motion devices are particularly adapted to move various elements, in a linear direction, to a desired position, such as the elements used in controlling a complex chemical process frequently involving a high temperature environment or for controlling various elements of a complex machine tool. The elements to be positioned may be located within a sealed pressure vessel which requires some type of seal where the linear motion device enters the sealed vessel.

In the prior art, linear motion devices of the general type to which this invention pertains have been developed for rectilinearly moving an element in opposite directions. These devices utilize gripper arms which are moved into and out of engagement with projections on an elongated element. Actuation of the gripper arms has been traditionally achieved by the use of magnet coils. In early applications of the prior art, at least five magnet coils were considered necessary to provide the aforementioned movement. Two of the magnet coils were utilized to provide movement to the latching gripper arms. A third coil was deemed necessary for the purpose of transferring the load from one gripper to the other before disengagement of the gripper initially supporting the linear element. In this way, frictional resistance and wear was substantially eliminated from the linear motion devices. Fourth and fifth coils were used to provide lift and pull down functions.

As can be appreciated, magnet coils constructed for use with such linear motion devices are extremely expensive to manufacture. This is especially so for those used in high temperature applications. Accordingly, relatively recent developments in the art provided a linear motion device of the gripper type having a total of three magnet coils to provide incremental linear motion for a linearly movable element. One example of such a linear motion device is shown and described in U.S. Pat. No. 3,158,766, entitled "Gripper Type Linear Motion Device", issued Nov. 24, 1964, by Erling Frisch and assigned to the present assignee. In this art, two of the coils provide, when energized, engagement of two sets of axially spaced grippers with the linear element. A third coil achieves lifting of the linearly movable element. Both the load transfer function and the pull down function, which were previously achieved by two additional magnet coils, are achieved in this more recent art by resilient means such as springs. The resilient means serve to bias the grippers in predetermined directions to accomplish the same function as the two magnet coils of the earlier prior art.

In even more recent art, merely two magnet coils are utilized to provide unidirectional incremental linear motion for a linear movable element. One of the magnet coils of this art provides a frictionless latching and unlatching function of one of two axially spaced grippers for the linearly movable element. The other magnet coil provides not only for frictionless latching and unlatching of the other of the two spaced grippers, but also provides the function of incrementally moving the linear element in the desired direction. One example of such a linear motion device is described in U.S. Pat. No. 3,299,302, entitled "Linear Motion Device", issued Jan. 17, 1967 by Erling Frisch and assigned to the present assignee.

All of the above described prior art, however, provides for the release of the linearly movable element upon the occurence of a sudden interruption of electrical power. Because the linearly movable element of that art was positioned vertically, sudden interruption of electrical power resulted in the element moving freely under the influence of gravity to a downward position. In certain applications, this feature of the prior art is highly desirable. One such application is to impart motion to a full length control rod for a nuclear reactor. Withdrawing a full length control rod causes an increase in nuclear reactivity, and conversely insertion of a full length control rod results in a decrease in nuclear reactivity. Thus, a sudden interruption in electrical power to a prior art linear motion device causes release of a control rod drive shaft associated with the control rod. This causes the control rod to be inserted in the nuclear core, thereby shutting down the nuclear reactor. In this application then, an electrical failure results in a fail-safe condition. Utilization of the prior art linear motion devices for part length control rods of commercial nuclear power plants, however, does not result in a fail-safe system. Part length control rods are utilized to trim the axial power distribution of a core and to prevent divergence of Xenon cycling within the core. In a typical large nuclear reactor, eight such part length control drive assemblies, each containing 20 individual control rods, are interspersed throughout the core. For purposes of comparison, the same reactor would also use 53 full length control rod assemblies.

A part length control rod contains absorber material only in the lower part of its length. Withdrawal of a part length control rod moves the absorber section from a lower to an upper part of the core; therefore, a part length control rod is not totally removed or withdrawn from the core as is the case with the regular control rods. Tripping, or rapidly inserting, a part length control rod may actually increase core reactivity. Simultaneous tripping of several part length control rods then may result in an undesirable increase in nuclear reactivity even though all the full length control rods are tripped at the same time. Understandably, the linear motion devices of the prior art of the type described above, are therefore unsatisfactory for use as control rod drive mechanism for the part length control rods of today's large commercial nuclear power plants. Hence, in the past, a different type of linear motion device namely, a roller nut type of drive mechanism, has been used to impart linear motion to part length control rods. An example of one such type of device is found in Baker Pat. No. 3,619,675.

In the roller nut type of linear motion device of the latter patent preceding linear element is provided with threads having a square configuration. A power drive roller nut which mates with the linear element also has square threads. Rotational driving of the roller nut, which is axially fixed, imparts axial motion to the linear element thereby causing the linear element to move axially. With this type of drive mechanism a sudden interruption of electrical power merely causes stoppage of the rotational motion of the drive nut; consequently, the linear element and the control rod attached thereto remain in that axial position immediately prededing loss of electrical power. For reasons mentioned above, this particular type of fail-safe operation, that is, prevention of subsequent axial motion following an interruption of electrical power, comprises a safety requirement for part length control rod drive mechanisms.

In the past, therefore, in certain large commercial nuclear power plants, at least two different types of control rod drive mechanisms have been utilitzed in order to satisfy the requirements of fail-safe operation. This undesirable aspect is overcome by the present invention which allows a magnet coil operated type of linear motion device having gripper arms attached thereto to be utilized for the part length control rods while providing the requisite fail-safe safety feature for this type of control rod.

SUMMARY OF THE INVENTION

A linear motion device is provided which moves an element in a step-by-step manner by gripper arms actuated by adjacent magnet coils, respectively, and fails safe by retaining the linear element in a prefailure position.

In one embodiment, three magnet coils provide the linearly movable element with incremental linear motion. Engagement of the linear element by two axially disposed grippers is provided by two of the coils, when energized. A third coil achieves lifting or lowering of the linearly movable element. Resilient means, such as springs, bias the grippers in predetermined directions to transfer the load from one gripper to the other prior to disengagement of the former to eliminate friction and wear. Locking means cooperating with the magnet coils are provided. One example comprises a linearly movable lock ring which is supplied with each of the axially disposed grippers. In this exemplary embodiment, the lock rings are arranged to be actuated by operation of the magnet coil located remotely from the gripper with which the lock ring cooperates. Thus, the grippers and the locking rings are interlocked operationally such that the gripper which is in engagement with the linear element is prevented by its associated locking ring from becoming disengaged and releasing the linear element as a result of a sudden interruption of electrical power.

BRIEF DESCRIPTION OF THE DRAWINGS

Other advantages of the invention and a better understanding of the invention will be apparent from the following detailed description taken in consideration with the accompanying drawings, in which.

DESCRIPTION OF THE PREFERRED EMBODIMENTS

Throughout the description which follows, like reference characters indicate like elements in the various figures of the drawings.

Figure 1:
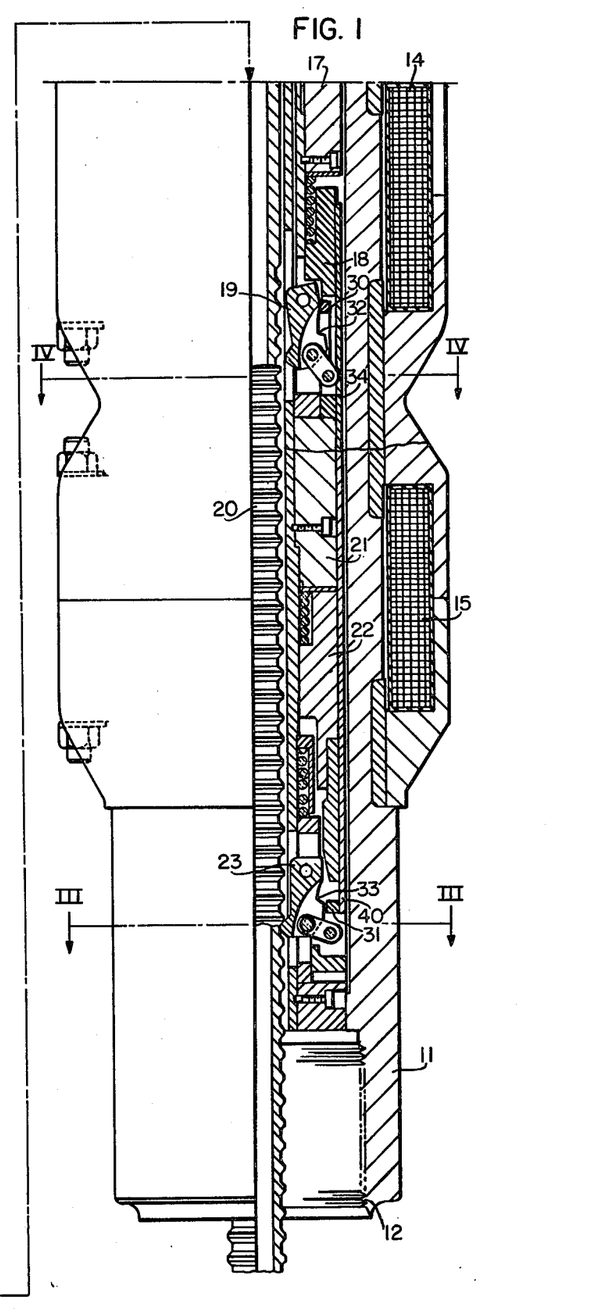
FIGS. 1 and 2, when taken end to end, comprise a composite elevational view, partially in section, of a linear motion device embodying an exemplary arrangement of this invention.
Figure 2:
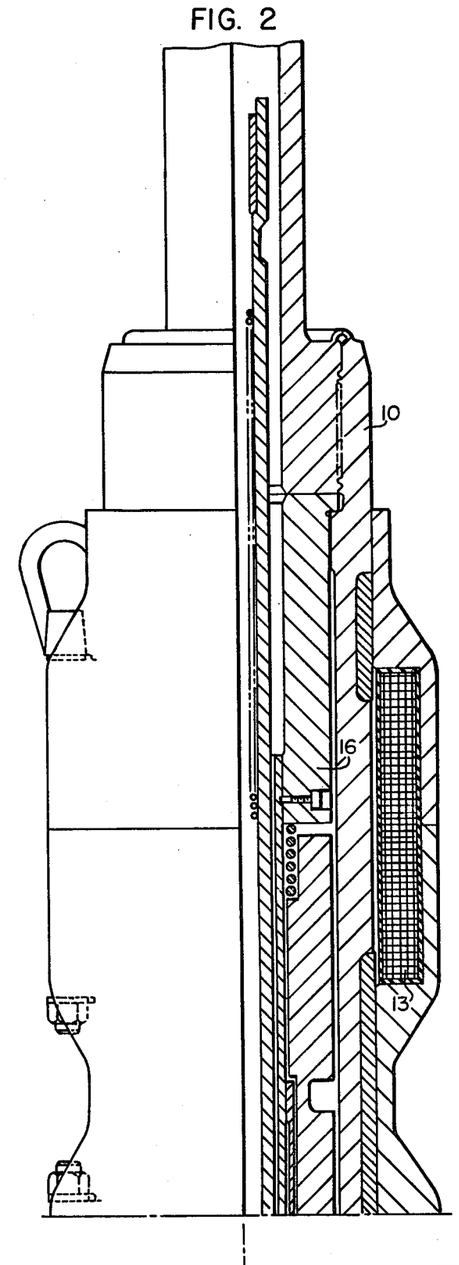

Referring now more particularly to FIGS. 1 and 2 of the drawings, a linear motion device constructed in accordance with the principles of this invention is illustrated therein. In this example, three magnet coils comprising for example, flat faced plunger magnets, are utilized to provide incremental linear motion to a linearly movable element. The invention however, is not thereby limited. The principles of this invention apply equally to linear motion devices having a different number and type of magnet coils.

In the illustrated example, a linear motion device is provided with a housing 10 formed from substantially non-magnetic material of a thickness capable of withstanding internal pressures on the order of 2000 psi. The lower end 11 of the housing 10 is provided with internal threads 12. The lower end 11 is thereby designed to be threadably secured in a suitable hermetic manner to a pressurized system with which the linear motion device is to be utilized. Three magnet coils 13, 14 and 15 are secured to housing 10 in the manner illustrated. A magnetic lift pole 16 having an annular configuration and a magnetic movable gripper pole 17, also having an annular configuration, are associated with lift coil 13. When lift coil 13 is energized the movable gripper pole 17 is moved axially until contact with lift pole 16 is achieved. Movable gripper pole 17 and movable gripper latch pole 18 are associated with magnet coil 14 comprising a movable gripper magnet coil. Activation of magnet coil 14 results in movement of movable gripper latch pole 18 such that latch arm 19 pivots and engages linear element 20.

Sequential activation of magnet coils 14 and 13, in that order, results in gripping of linear element 20 by latch arm 19 followed by incremental axial movement of linear element 20, movable gripper pole 17, movable gripper latch pole 18 and latch arm 19, as a single unit.

Stationary gripper pole 21 and stationary gripper latch pole 22 are associated with solenoid coil 15. Poles 21 and 22 are made from magnetic material and have an annular configuration. Stationary gripper pole 21 is fixed with respect to the linear motion device. Stationary gripper latch pole 22, on the other hand, is mounted for axial movement with respect to the linear motion device. Activation of magnet coil 15 causes stationary gripper latch pole 22 to move axially until it is in contact with stationary gripper pole 21. Motion of stationary gripper latch pole 22 results in rotation of latch arm 23 causing engagement of latch arm 23 with the linear element 20.

Additional details of the construction and operation of the above described linear motion device may be found in the aforementioned U.S. Pat. No. 3,158,766, entitled "Gripper Type Linear Motion Device", issued Nov. 24, 1964, by Erling Frisch and assigned to the present assignee, which is hereby incorporated by reference. It is to be noted, that the linear motion device of the present invention includes means for disposing the linear elements 20 relative to the latch arms 19 and 23 so that frictional wear of the latch arms and the linear element does not occur when the engagement of the linear element is transferred from one gripper to the other. The present linear motion device thereby eliminates excessive wear on the latch arms with the resulting mechanism having a substantially longer operating lifetime.

It is to be observed, that the linear motion device thus far described will release the linear element 20 in event of a sudden interruption of electrical power. Without electrical power, magnet coils 13, 14 and 15 become deactivated thereby disengaging latch arms 19 and 23 from linear element 20. Assuming the linear motion device is axially oriented, linear element 20, being free of restraint, will move downward under the influence of gravity. The apparatus, as provided by this invention, hereinafter described is designed to retain the linear element in the event of a sudden interruption of power, thereby preventing further axial motion of linear element 20.

A latch arm lock ring 30 is utilized between the outside of latch arms 19 and the inside of movable gripper latch pole 18 as shown in FIG. 1. A latch arm lock ring 31 is similarly positioned around the outside of latch arms 23. A notch, comprising an L-shaped configuration, is machined in the outside, substantially vertical surface of latch arms 19 and 23, that is, that surface adjacent the lock ring. Notches 32 and 33 in latch arms 19 and 23, respectively, are machined such that the respective "legs" of the L-shaped configuration are disposed substantially vertically and horizontally when the latch arms are disengaged from linear element 20. This allows relative axial motion between a latch arm and its associated lock ring when the lock arm is disengaged from linear element 20. In the embodiment exemplified, latch arm lock ring 30 which is associated with movable latch arm 19 is made to coact with the stationary gripper latch pole 22 by straps 34.

Figure 6:
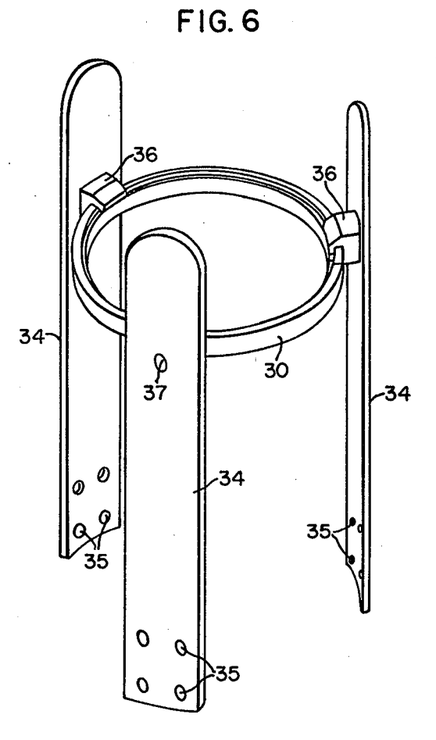
FIG. 6 is an isometric view of the movable gripper lock ring and straps, taken in isolation.
Figure 7:
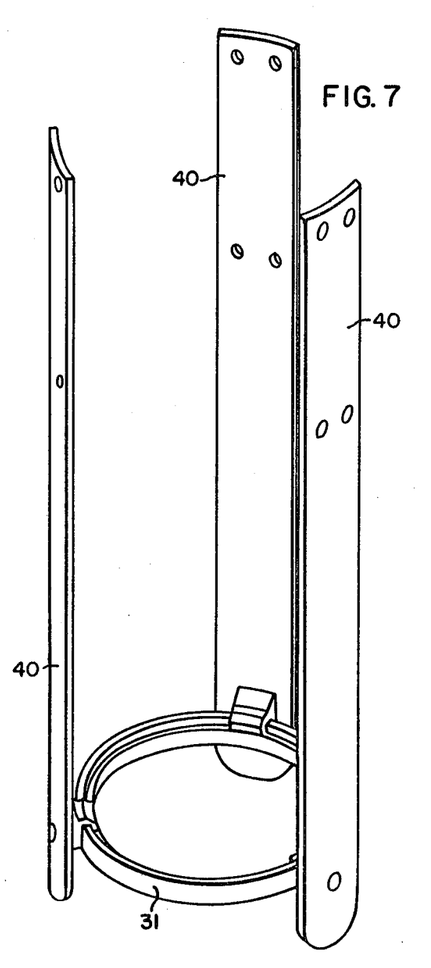
FIG. 7 is an isometric view of the stationary gripper lock ring and straps, taken in isolation.

FIG. 6 shows one form of the manufacturing and assembly details of lock ring 30 and its associated straps 34. As can be seen in this figure, straps 34 are slightly curved in a vertical plane so as to fit in a minimum of space within the linear motion device and to add stiffness to the straps. A plurality of holes 35 are provided in the straps at the end opposite the end securing the lock ring 30. Straps 34 are fixedly connected to the stationary gripper latch pole 22 by conventional means such as bolts passing through holes 35. Lock ring 30 may be secured to straps 34 by any conventional means; in the example shown, clips 36 having an L-shaped configuration are welded to straps 34. Pins 37 passing through straps 34, clips 36 and lock ring 30 fixedly position lock ring 30 with respect to straps 34. FIG. 7 shows an example of a method of manufacturing and assembling lock ring 31. As previously noted, lock ring 31 is associated with latch arm 23. Again, clips welded to straps 40 in conjunction with pins passing therethrough are utilized to fixedly connect lock ring 31 to straps 40. Straps 40 are fixedly connected to movable gripper pole 17 by bolts passing through the plurality of holes provided in straps 40.

Figure 3:
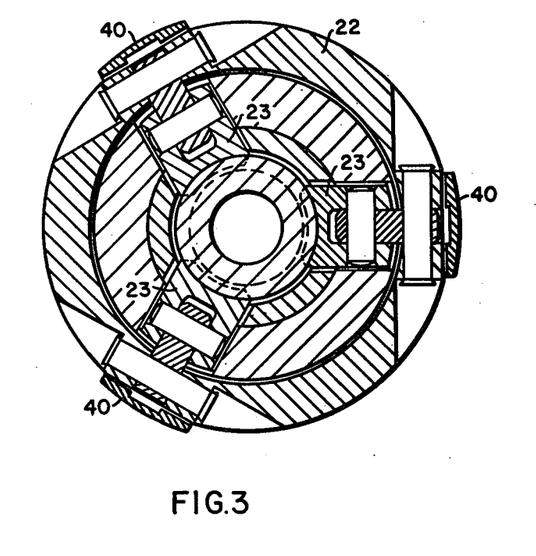
FIG. 3 is a sectional view of the linear motion device illustrated in FIGS. 1 and 2 and taken substantially along the line III—III of FIG. 1.
Figure 4:
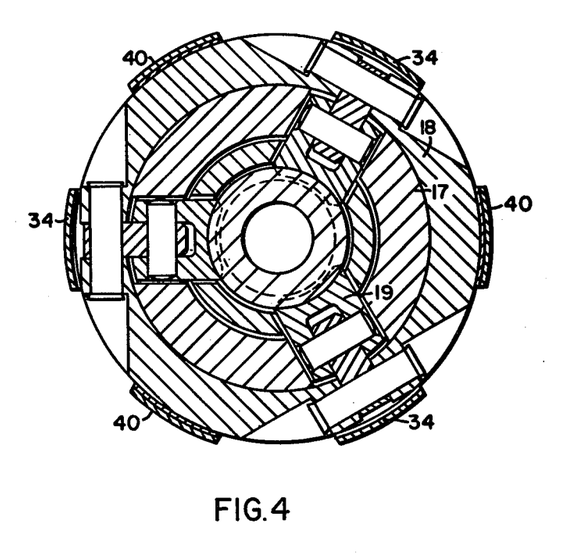
FIG. 4 is a sectional view of the linear motion device illustrated in FIGS. 1 and 2 taken substantially along the line IV—IV of FIG. 1.
Figure 5:
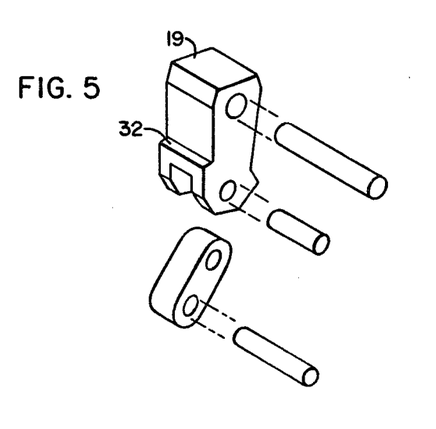
FIG. 5 is an isometric view of a gripper arm and its associated link and pins.

To help better understand the invention, thus far described, reference may be made to FIG. 5 wherein a typical latch arm and some of its associated hardware is shown. FIGS. 3 and 4 taken together show the radial orientation of latch arms 19 and 23 with respect to linear element 20. A method of securing latch arms 19 and 23 is also shown in these figures. In FIG. 4, the relative orientation of interconnecting straps 34 and 40 is shown.

Referring now to FIGS. 8 through 13, the apparatus provided by this invention will be described in accordance with an operational sequence of the linear motion device whereby the linear element is incrementally moved in a lifting direction. Also to be described will be the consequences of a sudden interruption of power as it affects subsequent axial motion of the linear element.

Figure 8:
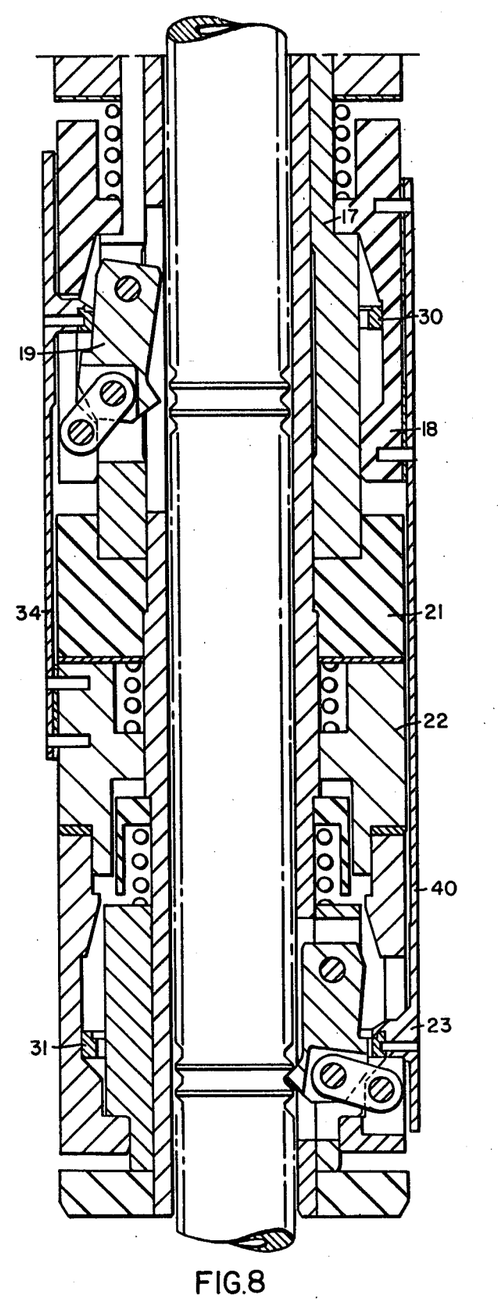
FIGS. 8 through 13, taken sequentially, illustrate a withdrawal sequence of the linear element and shows the fail-safe locking feature provided by this invention.

FIG. 8 shows linear element 20 being held stationary in a "hold" mode of operation of the linear motion device. Linear element 20 is held in this position by the stationary gripper latch arm 23. Lift coil 13 is deenergized; movable gripper magnet coil 14 is deenergized; stationary gripper magnet coil 15 is energized. Because of position of the movable gripper pole 17, lock ring 31 is located axially below notch 33 in stationary gripper latch arm 23. Interruption of electrical power deactivates stationary gripper magnet coil 15 which attempts to disengage stationary gripper latch arm 23 from linear element 20 but is thereby prevented from doing so by lock ring 31. The physical presence of lock ring 31 prevents latch arm 23 from pivoting and becoming disengaged. Hence, linear element 20 is axially retained in its position prior to the interruption of electrical power.

Figure 9:
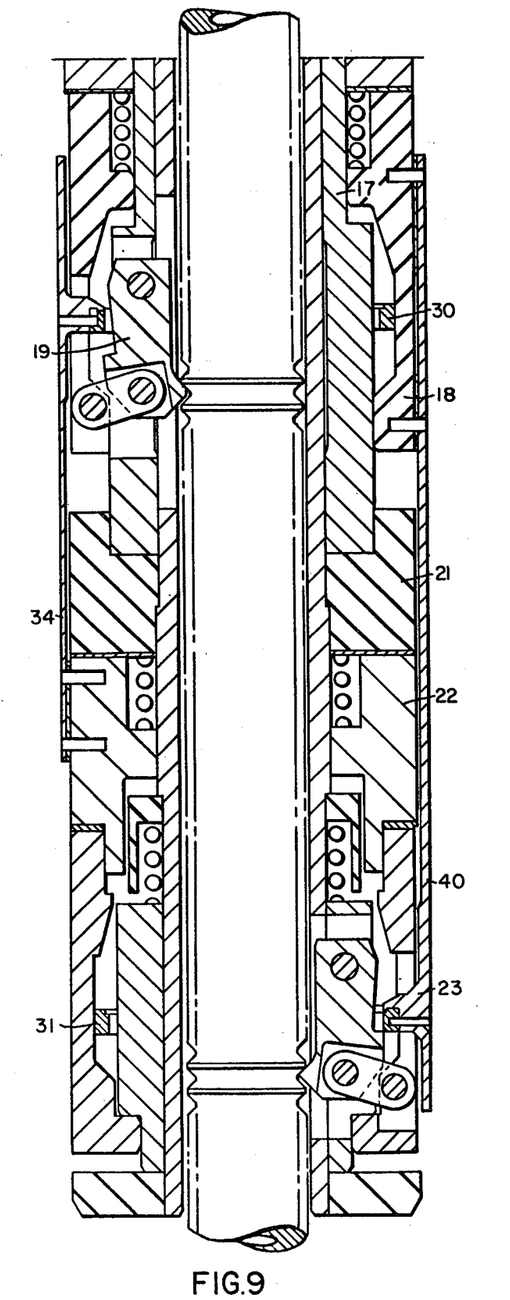

The next step in the lifting sequence is shown in FIG. 9. Lift coil 13 is deenergized; movable gripper magnet coil 14 is energized; stationary gripper magnet coil 15 is energized. Both movable gripper latch arm 19 and stationary gripper latch arm 23 are thereby engaging linear element 20. Energizing movable gripper magnet coil 14 results in lifting of movable gripper pole 17, and thereby lock ring 31. The lower internal edge of lock ring 31 is at this time positioned substantially coincident with the outer edge of the horizontal leg of notch 33 in stationary gripper latch arms 23. Lock ring 30 is positioned within the confines of notch 32 on movable gripper latch arm 19. An abrupt loss of electrical power at this time deactiviates movable gripper magnet coil 14 and stationary gripper magnet coil 15. Movable gripper latch arm 19 thereby becomes disengaged from linear element 20, however, stationary gripper latch arm 23 is prevented from becoming disengaged from linear element 20 by lock ring 31. Deenergizing movable gripper magnet coil 14, causes movable gripper pole 17 to move axially downward. Therefore, while stationary gripper latch arm 23 is attempting to become disengaged from linear element 20, lock ring 31 is moving downward toward a locking position. Because of the previously described spatial relationship of lock ring 30, with respect to notch 33, stationary gripper latch arm 23 is prevented from becoming disengaged from linear element 20. Hence, a sudden loss of electrical power does not result in release and subsequent axial motion of linear element 20.

Figure 10:
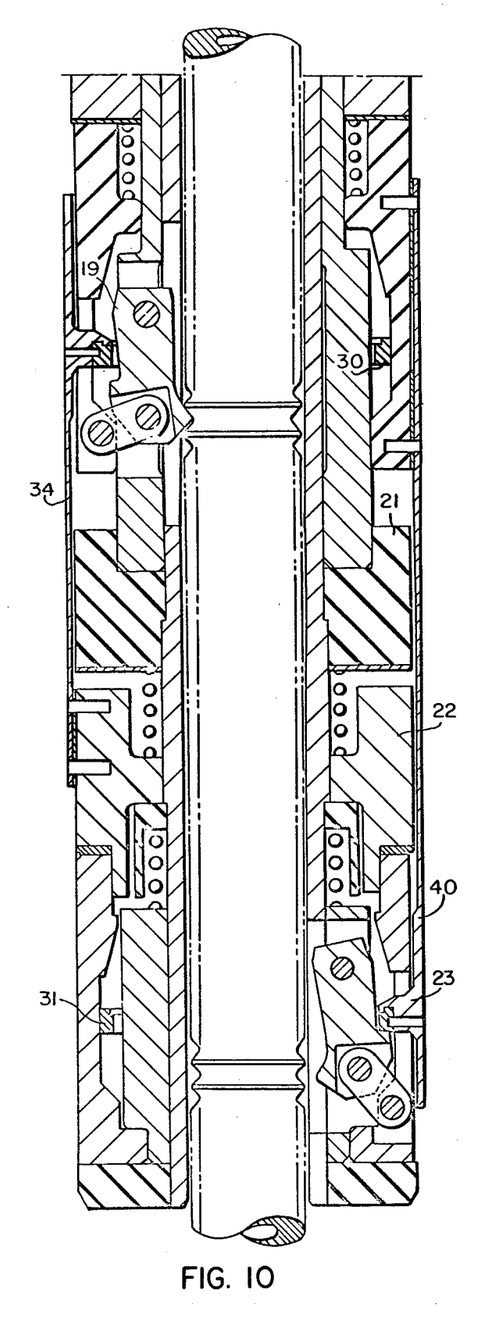

In FIG. 10, only the movable gripper magnet coil 14 is energized. The movable gripper latch arm 19 is supporting linear element 20. In the event of a power failure, movable gripper pole 17 attempts to move axially downward but is thereby prevented from doing so by lock ring 31 being engaged within notch 33 of the stationary gripper latch arm 23. Thus, the movable gripper latch arm 19 remains in support of linear element 20.

Figure 11:
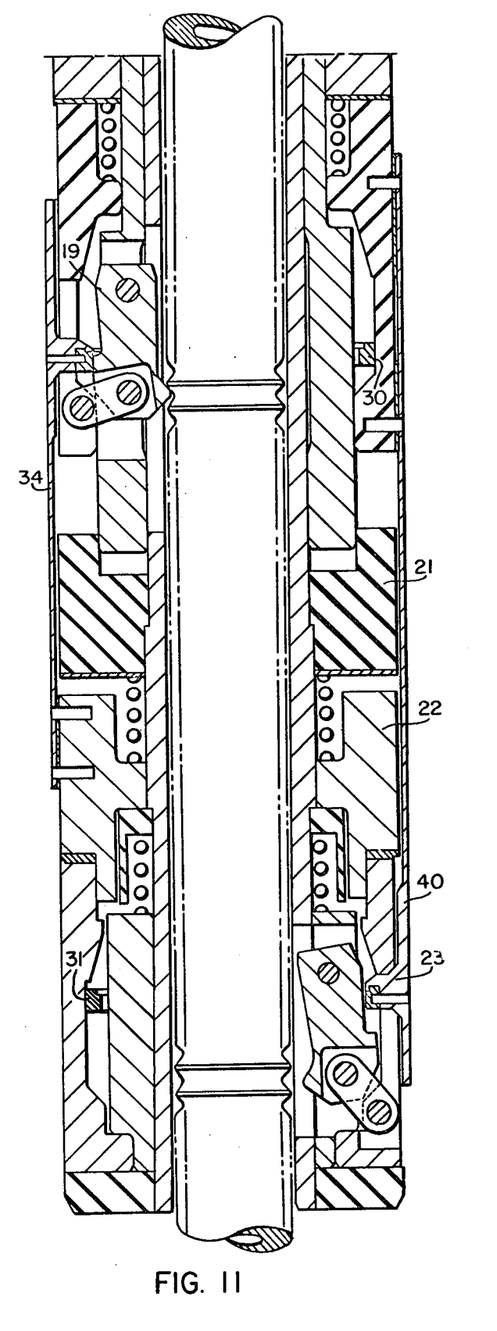

In FIG. 11, lift magnet coil 13 is energized; movable gripper magnet coil 14 is energized; stationary gripper magnet coil 15 is deenergized. Hence, linear element 20 is being moved incrementally in an upward direction. In the event of a power failure during this part of the sequence, lock ring 30 will maintain engagement of the movable gripper latch arm 19 with linear element 20. It being realized that the stationary gripper magnet coil was deenergized prior to the power failure thereby maintaining the stationary gripper latch pole 22 as well as lock ring 30 in a downward position.

During this sequence, lift magnet coil 13 will become deenergized upon the occurrence of a power failure resulting in downward motion of linear element 20 while still engaged with movable gripper latch 19. Linear element 20 will move downward one increment only. Upon completion of this incremental downward movement, the relative positions of the various components will be as shown in FIG. 10.

Figure 12:
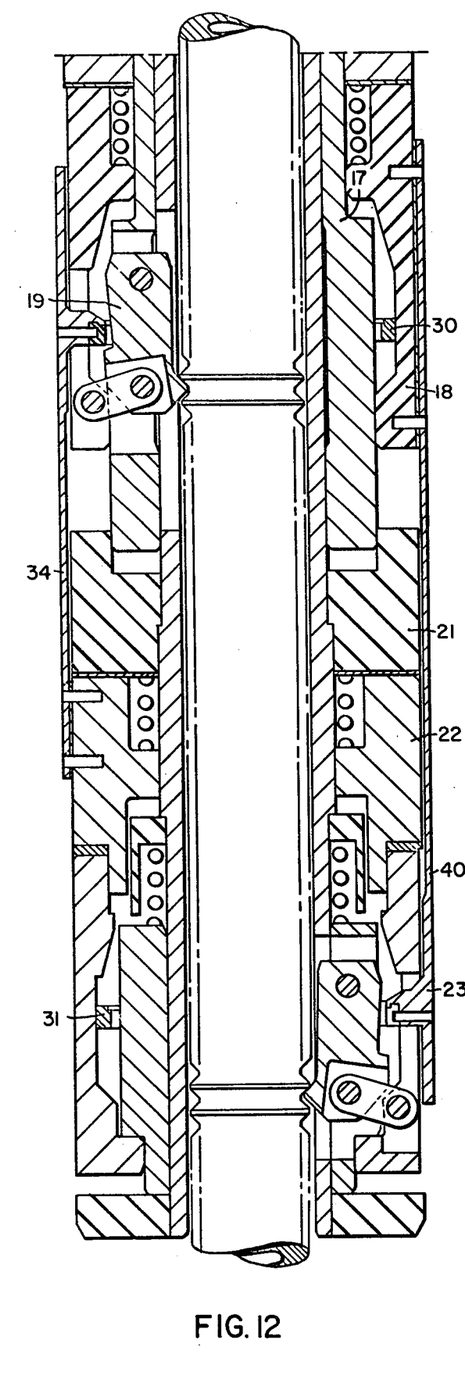

The lifting sequence shown in FIG. 12 results with all magnet coils, namely, lift magnet coil 13, movable gripper magnet coil 14 and stationary gripper magnet coil 15, energized. The stationary gripper latch arm 23 is supporting linear element 20. Movable gripper latch arm 19 is frictionally disengaged from linear element 20. A power failure at this time would again result in lowering linear element 20 one increment. Again, the final position of all components will be as that shown in FIG. 10.

Figure 13:
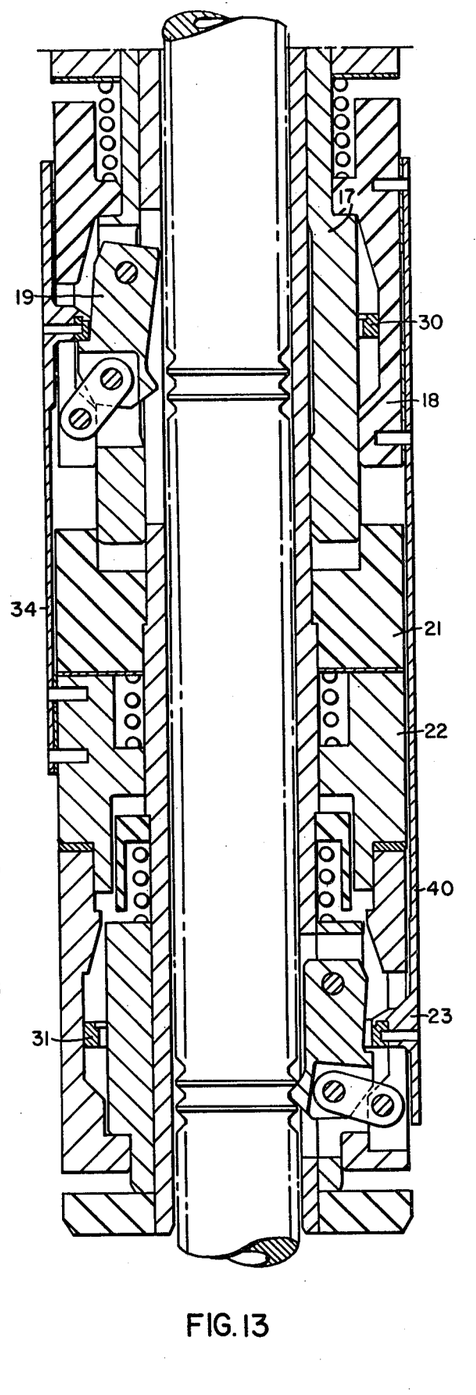

FIG. 13 illustrates the final stage in the lifting sequence. Linear element 20 is being supported by the stationary gripper latch arm 23. The movable gripper latch arm 19 has become disengaged by deenergizing the movable gripper magnet coil in preparation for the next sequential step comprising movement of the movable gripper latch arm 19 downward one increment. In the event of a power failure, the condition shown in FIG. 8 or FIG. 10 will result. In either case, linear element 20 will be retained by one of the two latch arms, 19 or 23.

To continue lifting linear element 20 one increment at a time, the previously described sequence is repeated starting with FIG. 8.

Figure 14:
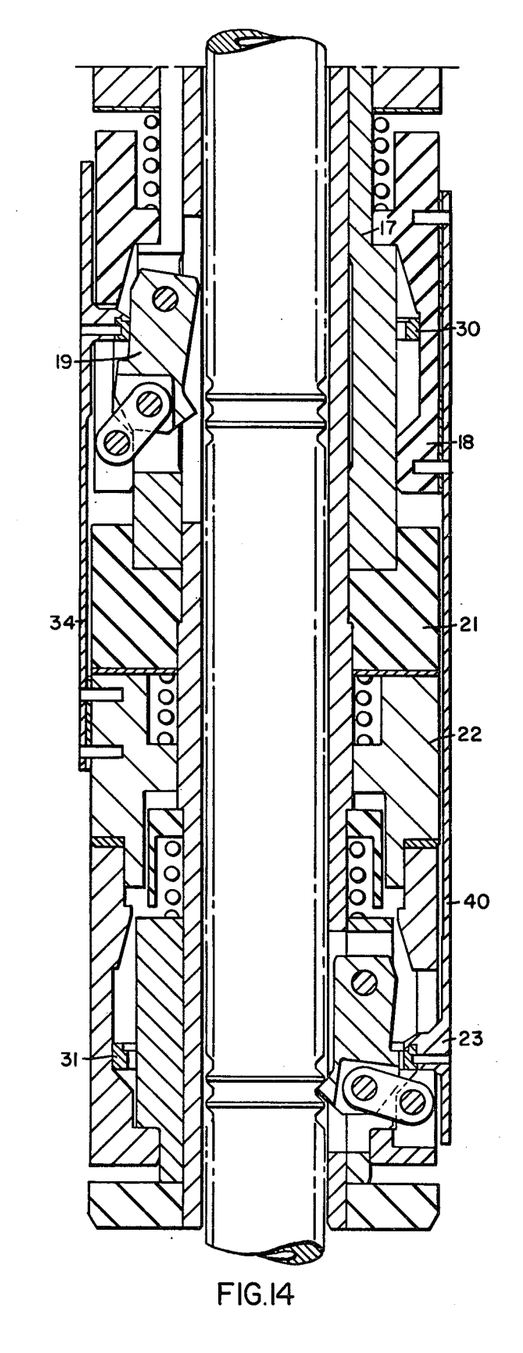
FIGS. 14 through 19, taken sequentially illustrates an insertion sequence of the linear element and shows the fail-safe feature of the invention during this mode of operation.
Figure 15:
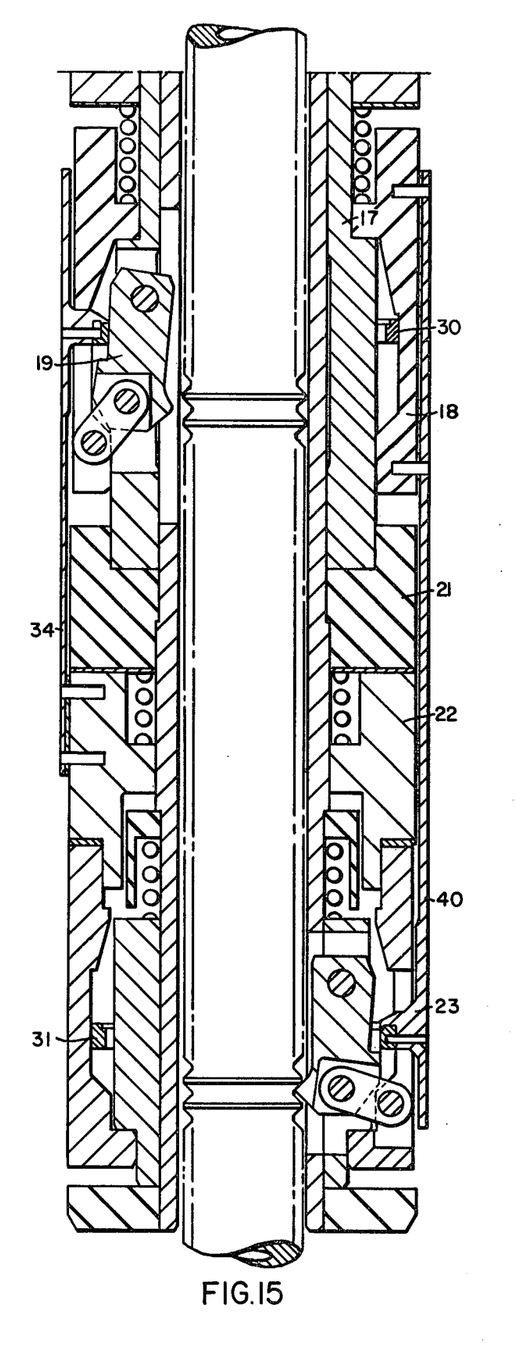
Figure 16:
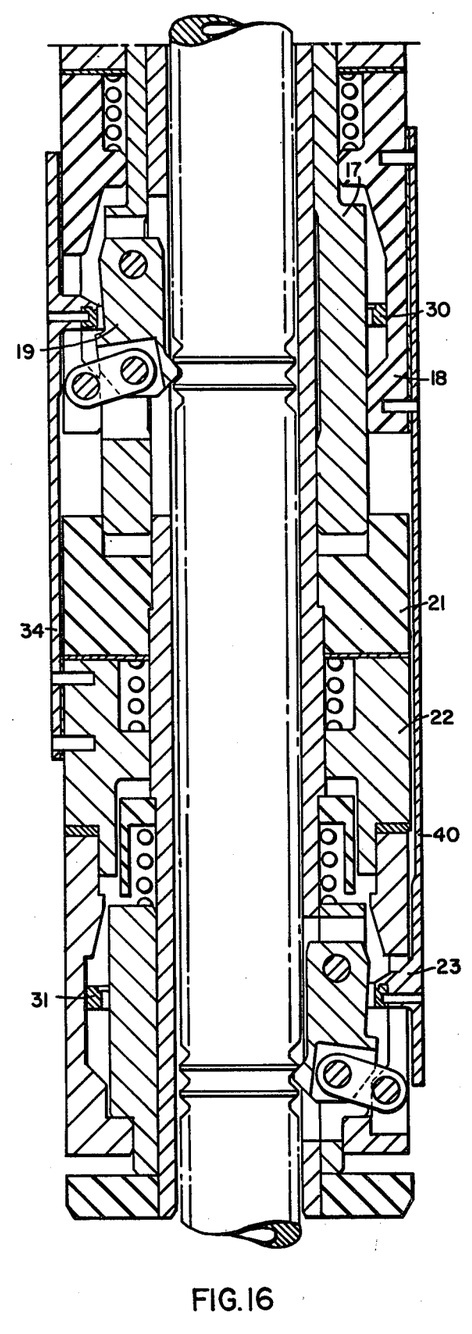
Figure 17:
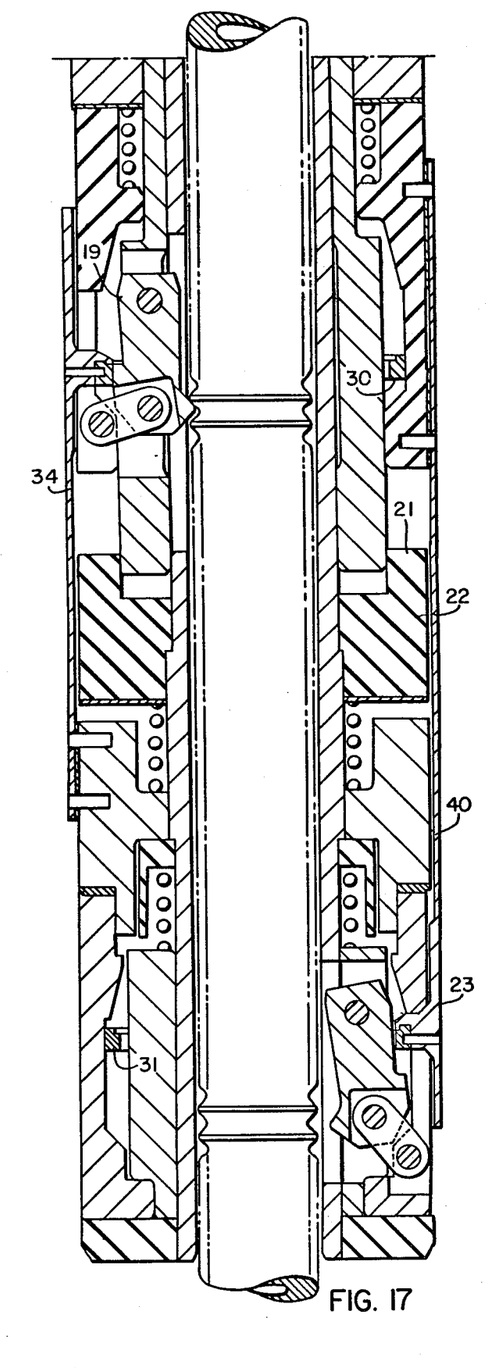
Figure 18:
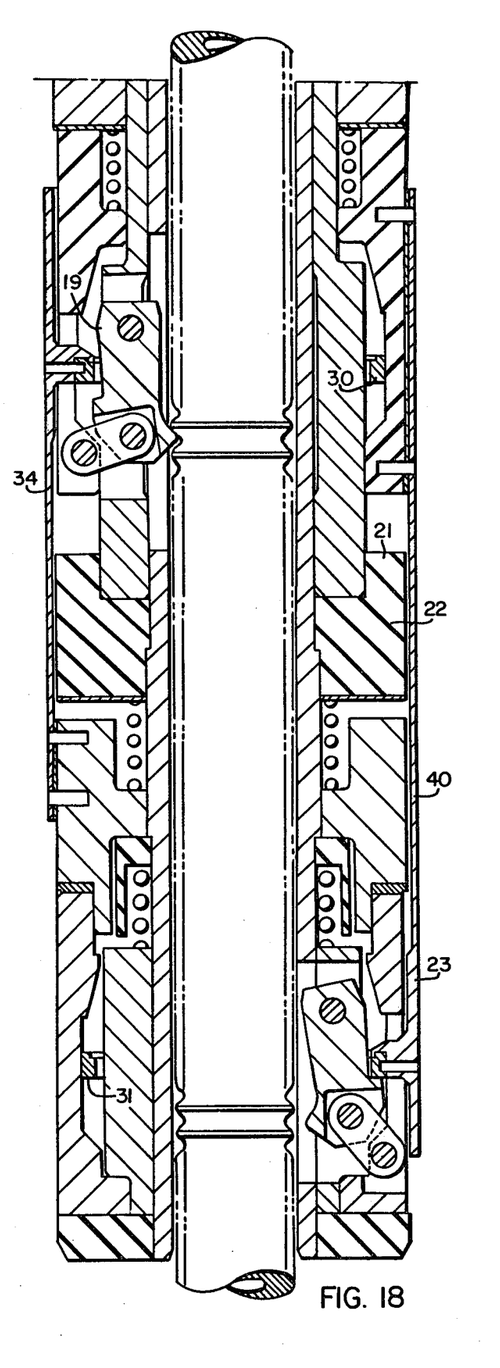
Figure 19:
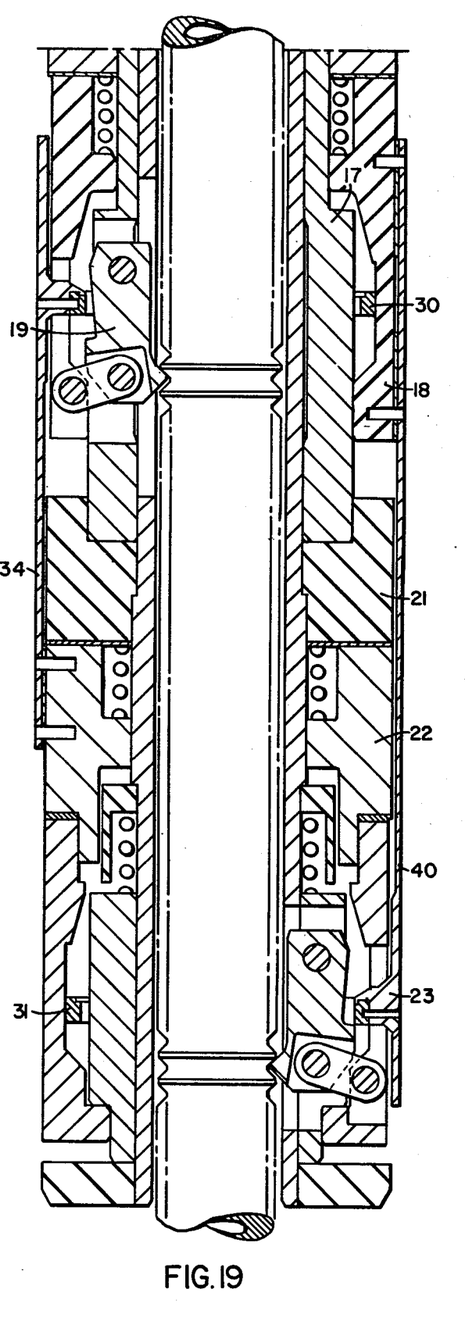

It will be appreciated by one skilled in the art that the sequence involved in lowering linear element 20 one increment at a time, is the reverse of the previously described lifting sequence. Hence, FIG. 14 which represents the condition at the initiation of the lowering sequence, is exactly the same as that shown in FIG. 8. The second step in the lowering sequence, shown in FIG. 15, is the same as the condition in lifting sequence shown in FIG. 13. Similarly, FIG. 16 is the same as FIG. 12, FIG. 17 is the same as FIG. 11, FIG. 18 is the same as FIG. 10, and finally FIG. 19 is the same as FIG. 9. FIG. 19 being the last step in the lowering sequence of linear element 20 prior to assuming the hold position shown in FIG. 8.

Figure 20:
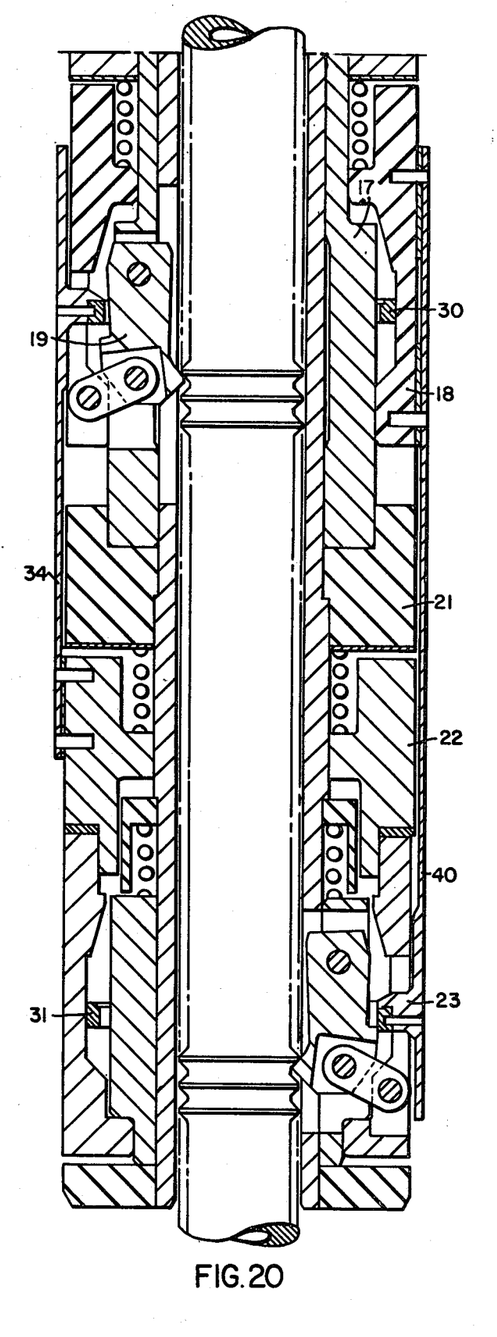
FIG. 20 represents an intermediate position of the apparatus provided by this invention after a sudden interruption of electrical power illustrating the impossibility of release of the linear element.

FIG. 20 represents the condition which can occur during a lifting sequence or a lowering sequence of the linear element. The figure shows the sequence of events following a loss of power from a condition illustrated by FIGS. 9 and 19. Lift magnet coil 13 is deenergized while movable gripper magnet coil 14 and stationary gripper magnet coil 15 are energized. Loss of power will deenergize magnet coil 14 and 15 resulting in simultaneous partial opening of movable gripper pole 17 and stationary gripper latch pole 22. This condition is shown in FIG. 20 which demonstrates that total disengagement of both latch arms simultaneously is impossible. From the foregoing description, taken in connection with the drawings, it is seen that this invention provides a linear motion device which operates electromechanically by moving a linear element in either direction in incremental steps and prevents release of the linear element in the event of a sudden interruption of electrical power regardless of the mode of operation of the device at the time of loss of power.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

What is claimed is:

1. A linear motion device comprising an elongated linearly movable element, two axially spaced gripper means for engaging said linear element, electrically energized magnet coil means for activating said gripper means and for incrementally moving said linear element in a rectilinear manner in both longitudinal directions, and means for substantially maintaining the relative axial position of said linear element with respect to said linear motion device, said means including locking apparatus for maintaining engagement of at least one of said two gripper means with said linear element to prevent movement of said linear element in either longitudinal direction, said locking apparatus being activated when electrical power to said magnet coil means is interrupted.

2. The linear motion device of claim 1, wherein linear element as a plurality of axially spaced teeth thereon, and each of said gripper means comprises at least one gripper member having a projection thereon for engaging with said teeth on said linear element, said gripper member being pivotally connected to a support member which is in spaced, concentric relationship with respect to said linear element, said gripper member being pivotally moved into and out of engagement with said linear element by said magnet coil means.

3. The linear motion device of claim 1, wherein each of said gripper means includes a pivotally mounted gripper member and has associated therewith at least one magnet coil means, each magnet coil means comprising a magnet coil having an annular configuration, a support structure for supporting said magnet coil in concentric spaced relationship with said linear element, and a movable magnet pole having an annular configuration, said magnet pole being concentrically interposed with said linear element and said associated magnet coil, said movable magnet pole serving to pivot said gripper member into and out of engagement with said linear element.

4. The linear motion device of claim 3, wherein one of said magnet coil means includes two movable magnet poles, in spaced axial relationship, each pole being mounted concentric with said linear element, with the first of said movable poles serving to pivot said associated gripper member into and out of engagement with said linear element, and the second of said movable poles serving to incrementally move said linear element in a unidirectional rectilinear direction.

5. The linear motion device of claim 3, wherein one of said gripper means has associated therewith two magnet coil means, one of said magnet coil means serving to pivot said gripper member into and out of engagement by activation of its associated magnet coil, the other of said magnet coil means serving to incrementally move said linear element in a rectilinear direction by its associated magnet coil when said gripper member is engaged with said linear element.

6. The linear motion device of claim 3, wherein each of said gripper members has three positions with respect to said linear element comprising unlatched, coupled and latched positions, said positions being attained by said magnet coils respectively associated with said gripper members in combination with biasing means.

7. The linear motion device of claim 1, wherein said gripper means comprise a first gripper means and a second gripper means, each gripper means including a plurality of gripper members disposed circumferentially around said linear element, and said magnet coil means comprise a first magnet coil means coacting with said first gripper means, and a second magnet coil means coacting with said second gripper means, each magnet coil means comprising a magnet coil and a movable magnet pole, said movable pole being moved axially by activation of said associated magnet coil, each of said gripper means respectively coacting with said magnet coil means such that movement of said movable pole pivots said gripper members into and out of engagement with said linear element, said locking apparatus including at least one locking member, said locking member being fixedly mounted to the movable pole of said first magnet coil means and axially disposed substantially coextensive with the gripper members of said second gripper means such that the gripper members of said second gripper means are prevented from disengaging from said linear element when electrical power to said first magnet coil means is interrupted.

8. A linear motion device comprising, a linearly movable elongated element, at least two axially spaced gripper means for engaging said linear element, electrically energized magnet coil means for activating said gripper means and for incrementally moving said linear element in a rectilinear manner in both longitudinal directions, and means for substantially maintaining the relative axial position of said linear element with respect to said linear motion device, including apparatus for locking at least one of said gripper means to said linear element, said means being activated when electrical power to said magnet coil means is interrupted, said gripper means comprising a first gripper means and a second gripper means, circumferentially around said linear element, said magnet coil means comprising a first magnet coil means coacting with said first gripper means, and a second magnet coil means coacting with said second gripper means, each magnet coil means comprising a magnet coil and a movable magnet pole, said movable pole being moved axially by activation of said associated magnet coil, each of said gripper means respectively coacting with said magnet coil means such that movement of said movable pole pivots said gripper members into and out of engagement with said linear element, and said axial position retaining means comprises a first locking member and second locking member, said first locking member being fixedly mounted to the movable pole of said first magnet coil means and axially disposed substantially coextensive with the gripper members of said second gripper means, said second locking member being fixedly mounted to the movable pole of said second magnet coil means and axially disposed substantially coextensive with the gripper members of said first gripper means, said gripper member and said locking members being respectively positioned axially such that when electrical power to the remote magnet coil is interrupted, the gripping members associated with the near magnet coil are prevented by the near locking member from disengaging from the linear element, and when electrical power is supplied to the remote magnet coil, the gripping members associated with the near magnet coil are not prevented by the near locking member from disengaging from the linear element.

9. The linear motion device of claim 8, wherein said gripper members each comprise a bar having a substantially square cross sectional configuration with a projection on an outward surface thereof, said gripper members being pivotally connected at one end to a support having an annular configuration, said support being concentrically positioned with respect to said linear element, said gripper members being pivotally connected at their other end to a link member, said link member being pivotally mounted to said movable pole associated with said gripper members, said gripper members being thereby connected such that axial movement of said associated movable pole, pivots said gripper members into and out of engagement with said linear element, and said locking member associated with said gripper members has an annular configuration, said locking member having said associated gripper members extending therethrough and being axially positioned substantially coextensive with said projection on said gripper members thereby preventing pivotal movement of said gripper members when electrical power to remove magnet coil is interrupted.

* * * * *